United States Patent
McCauley et al.

(10) Patent No.: US 9,228,037 B2
(45) Date of Patent: Jan. 5, 2016

(54) BULK POLYMERIZATION PROCESS FOR PRODUCING POLYDIENES

(71) Applicant: Bridgestone Corporation, Tokyo (JP)

(72) Inventors: Kevin M. McCauley, Akron, OH (US); Zengquan Qin, Copley, OH (US); Joshua S. Dickstein, Copley, OH (US); Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/368,946

(22) PCT Filed: Dec. 27, 2012

(86) PCT No.: PCT/US2012/071702
§ 371 (c)(1),
(2) Date: Jun. 26, 2014

(87) PCT Pub. No.: WO2013/101861
PCT Pub. Date: Jul. 4, 2013

(65) Prior Publication Data
US 2014/0378630 A1    Dec. 25, 2014

Related U.S. Application Data

(60) Provisional application No. 61/580,492, filed on Dec. 27, 2011.

(51) Int. Cl.
*C08F 4/52* (2006.01)
*C08F 136/04* (2006.01)
*C08F 136/06* (2006.01)
*C08F 4/54* (2006.01)
*C08F 36/04* (2006.01)

(52) U.S. Cl.
CPC .............. *C08F 136/06* (2013.01); *C08F 4/545* (2013.01); *C08F 36/04* (2013.01)

(58) Field of Classification Search
CPC ....... C08F 4/545; C08F 136/04; C08F 136/06
See application file for complete search history.

(56) References Cited

U.S. PATENT DOCUMENTS

2009/0264604 A1    10/2009  Kaita et al.

FOREIGN PATENT DOCUMENTS

| | | |
|---|---|---|
| EP | 0919574 A1 | 6/1999 |
| EP | 1512700 A1 | 3/2005 |
| EP | 1939221 A2 | 7/2008 |
| EP | 2017280 A1 | 1/2009 |
| EP | 2075267 A2 | 7/2009 |
| JP | 2004-27179 A | 1/2004 |
| WO | 2005061563 A1 | 7/2005 |
| WO | 2009126567 A1 | 10/2009 |
| WO | 2010151648 A1 | 12/2010 |

OTHER PUBLICATIONS

Adams, Florian, International Search Report with Written Opinion from PCT/US2012/071702, 10 pp. (May 29, 2013).

*Primary Examiner* — Caixia Lu
(74) *Attorney, Agent, or Firm* — Meredith E. Hooker; Arthur M. Reginelli

(57) ABSTRACT

A process for preparing a polydiene, the process comprising the steps of: polymerizing conjugated diene monomer with a metallocene complex catalyst system within a polymerization mixture that includes less than 20% by weight of solvent based on the total weight of the polymerization mixture, where the metallocene complex catalyst system includes the combination or reaction product of: (a) metallocene complex, (b) an alkylating agent, and optionally (c) a non-coordinating anion.

18 Claims, No Drawings

BULK POLYMERIZATION PROCESS FOR PRODUCING POLYDIENES

This application claims the benefit of U.S. Provisional Application Ser. No. 61/580,492, filed on Dec. 27, 2012, which is incorporated herein by reference.

FIELD OF THE INVENTION

One or more embodiments of the present invention are directed toward a bulk polymerization process for producing polydienes having a combination of a high cis-1,4-linkage content and a narrow molecular weight distribution. Other embodiments are directed toward the catalyst compositions employed in these processes.

BACKGROUND OF THE INVENTION

Lanthanide-based catalyst systems that comprise a lanthanide compound, an alkylating agent, and a halogen source are known to be useful for producing conjugated diene polymers having high cis-1,4-linkage contents. Nevertheless, when applied to bulk polymerization of conjugated dienes, lanthanide-based catalyst systems generally provide cis-1,4-polydienes.

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent.

For example, conjugated diene monomer has been polymerized in solution using metallocene complexes and/or half-metallocene complexes based upon lanthanoid elements, scandium and yttrium. These catalyst complexes have been used in conjunction with aluminoxanes, organic aluminum compounds and ionic compounds to produce polydienes having a high cis-1,4-content.

Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Catalyst technology, particularly as it pertains to the polymer synthesis, can often be unpredictable, and the transfer of technology from one system to another, or the altering of certain variables, can offer technological difficulties. Thus, while bulk polymerization systems offer a number of advantages, the transfer of known solution technology to bulk systems can be unpredictable and filled with technological challenges.

SUMMARY OF THE INVENTION

Embodiments of the present invention provide a process for preparing a polydiene, the process comprising the steps of: polymerizing conjugated diene monomer with a metallocene complex catalyst system within a polymerization mixture that includes less than 20% by weight of solvent based on the total weight of the polymerization mixture, where the metallocene complex catalyst system includes the combination or reaction product of: (a) metallocene complex, (b) an alkylating agent, and optionally (c) a non-coordinating anion.

DETAILED DESCRIPTION OF ILLUSTRATIVE EMBODIMENTS

Embodiments of the present invention are based on the discovery of a bulk polymerization process for producing polydienes by polymerizing conjugated diene monomer with a metallocene complex-based catalyst system. The metallocene complex may include a lanthanide-series metal, scandium, or yttrium. When used with bulk systems, the catalyst systems of certain embodiments allow for control of the polymerization exotherm while yielding polymers with high cis contents, low vinyl contents, narrow molecular weight distributions, and useful functionality.

In one or more embodiments, the catalyst systems include the combination or reaction product of the metallocene complex, an alkylating agent, and an optional non-coordinating anion. In one or more embodiments, where an aluminoxane is employed as an alkylating agent, the catalyst system includes the combination or reaction product of the metallocene complex and an aluminoxane compound. In other embodiments, where an organoaluminum compound is used as an alkylating agent, the catalyst system includes the combination or reaction product of the metallocene complex, an organoaluminum compound, and a non-coordinating anion.

Monomer

In one or more embodiments, examples of conjugated diene monomer that can be polymerized according to the present invention include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Metallocene Complex

As mentioned above, the catalyst systems employed in practice of the invention include a metallocene complex including a lanthanide-series metal, scandium, or yttrium. As is known in the art, metallocene complexes include those complexes where a metal is coordinated with one or two cyclopentadienyl or cyclopentadienyl derivatives. Depending on the valence of the metal, one or more additional compounds may be bound or coordinated to the lanthanide metallocene. In one or more embodiments, where two cyclopentadienyl or cyclopentadienyl derivatives are coordinated to the metal atom, the metallocene complex may be referred to as a regular metallocene complex. In one or more embodiments, where only one cyclopentadienyl or cyclopentadienyl derivative is coordinated to the metal atom, the metallocene complex may be referred to as a half metallocene complex. In other embodiments, where the cyclopentadienyl or cyclopentadienyl derivative is connected to a cyclopentadienyl, cyclopentadienyl derivative, or another group coordinated to the metal, the metallocene complex may be referred to as a bridged metallocene complex.

In one or more embodiments, the metallocene complex may be defined by the formula I:

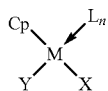

where M is a lanthanide-series element, scandium, or yttrium, Cp is a cyclopentadienyl group or a cyclopentadienyl derivative group, Y is a hydrocarbyloxy group, a thiohydrocarbyloxy group, an amine group, a silyl group, cyclopentadienyl group, or a cyclopentadienyl derivative group, X is hydrogen atom, a halogen atom, a hydrocarbyloxy group, a thiohydrocarbyloxy group, an amine group, a silyl group, or a monovalent organic group, each L is individually a neutral Lewis base, and n is a number from 0 through 3, or where Cp and Y are joined by a divalent group.

In one or more embodiments, cyclopentadienyl derivatives include compounds with at least one aromatic five member ring structure. The five member ring structure of the cyclopentadiene derivatives can include one or more groups or ring structures bound to the five member ring structure. In one or more embodiments, cyclopentadienyl derivatives may include 1,2,3,4,5-pentamethylcyclopentadiene, indenyl groups, or fluorenyl groups.

In one or more embodiments, types of silyl groups, which include substituted silyl groups, include, but are not limited to, trihydrocarbylsilyl, trisilyloxysilyl, trihydrocarbyloxysilyl, trisilylsilyl, dihydrocarbylhydrosilyl, dihydrocarbyl(silyloxy)silyl, dihydrocarbyl(silyl)silyl, dihydrocarbyl(hydrocarbyloxy)silyl, hydrocarbyldihydrosilyl, hydrocarbyl(disilyloxy)silyl, hydrocarbyl(disilyl)silyl, and hydrocarbyl(dihydrocarbyloxy)silyl groups. Specific types of silyl groups may include, for example, trialkylsilyl, dialkylhydrosilyl, dialkyl(silyloxy)silyl, dialkyl(silyesilyl, tricycloalkylsilyl, dicycloalkylhydrosilyl, dicycloalkyl(silyloxy)silyl, dicycloalkyl(silyl)silyl, trialkenylsilyl, dialkenylhydrosilyl, dialkenyl(silyloxy)silyl, dialkenyl(silyl)silyl, tricycloalkenylsilyl, dicycloalkenylhydrosilyl, dicycloalkenyl(silyloxy)silyl, dicycloalkenyl(silyl)silyl, triarylsilyl, diarylhydrosilyl, diaryl(silyloxy)silyl, diaryl(silyl)silyl, triallylsilyl, diallylhydrosilyl, diallyl(silyloxy)silyl, diallyl(silyl)silyl, triaralkylsilyl, diaralkylhydrosilyl, diaralkyl(silyloxy)silyl, diaralkyl(silyl)silyl, trialkarylsilyl, dialkarylhydrosilyl, dialkaryl(silyloxy)silyl, dialkaryl(silyl)silyl, trialkynylsilyl, dialkynylhydrosilyl, dialkynyl(silyloxy)silyl, dialkynyl(silyl)silyl, tris(trialkylsilyloxy)silyl, tris(triarylsilyloxy)silyl, tris(tricycloalkylsilyloxy)silyl, tris(trialkoxysilyloxy)silyl, tris(triaryloxysilyloxy)silyl, or tris(tricycloalkyloxysilyloxy) silyl groups. Substituted silyl groups include silyl groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, amino groups include those groups defined by the formula —$NR_2$, where each R is independently a monovalent organic group or where each R joins to form a divalent organic group. Types of amino groups include, but are not limited to, dihydrocarbylamino, bis(trihydrocarbylsilyl)amino, bis(dihydrocarbylhydrosilyl) amino, 1-aza-disila-1-cyclohydrocarbyl, (trihydrocarbylsilyl) (hydrocarbyl)amino, (dihydrocarbylhydrosilyl) (hydrocarbyl)amino, 1-aza-2-sila-1-cyclohydrocarbyl, dihydrocarbylamino, and 1-aza-1-cyclohydrocarbyl groups.

In one or more embodiments, hydrocarbyloxy groups or substituted hydrocarbyloxy groups such as, but not limited to, alkyloxy, cycloalkyloxy, alkenyloxy, cycloalkenyloxy, aryloxy, allyloxy, aralkyloxy, alkaryloxy, or alkynyloxy groups. Substituted hydrocarbyloxy groups include hydrocarbyloxy groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, thiohydrocarbyloxy groups, which include substituted thiohydrocarbyloxy groups, include, but are not limited to, thioalkyloxy, thiocycloalkyloxy, thioalkenyloxy, thiocycloalkenyloxy, thioaryloxy, thioallyloxy, thioaralkyloxy, thioalkaryloxy, or thioalkynyloxy groups. Substituted thiohydrocarbyloxy groups include thiohydrocarbyloxy groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, halogen atoms include, but are not limited to, fluorine, chlorine, bromine, and iodine.

In one or more embodiments, examples of the neutral Lewis bases include, but are not limited to, tetrahydrofuran, diethyl ether, dimethyl aniline, trimethyl phosphine, lithium chloride, neutral olefins, and neutral diolefins.

In one or more embodiments, monovalent organic groups may include hydrocarbyl groups, including substituted hydrocarbyl groups, such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, divalent groups include, but are not limited to, divalent organic groups and divalent silyl groups. In one or more embodiments, divalent organic groups may include hydrocarbylene groups including substituted hydrocarbylene groups. For example, hydrocarbylene groups include alkylene, cycloalkylene, alkenylene, cycloalkenylene, alkynylene, cycloalkynylene, or arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. These groups may also contain one or more heteroatoms such as, but not limited to, nitrogen, oxygen, boron, silicon, sulfur, tin, and phosphorus atoms. In other embodiments, divalent silyl groups include silylene groups including substituted silylene groups. Substituted silylene groups include silylene groups in which one or more hydrogen atoms have been replaced by a substituent such as an alkyl group. In one or more embodiments, these groups may include two, or the appropriate minimum number of silicon atoms to form the group, to 20 carbon atoms. These groups may also contain one or more heteroatoms such as, but not limited to, nitrogen, oxygen, boron, carbon, sulfur, tin, and phosphorus atoms.

In one or more embodiments, where the Y group of formula I is a cyclopentadienyl group or a cyclopentadienyl derivative group (i.e. Cp group), the metallocene complex may be defined by the formula II:

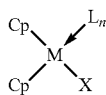

where M is a lanthanide-series element, scandium, or yttrium, each Cp is individually a cyclopentadienyl group or a cyclopentadienyl derivative group, X is hydrogen atom, a halogen atom, an hydrocarbyloxy group, a thiohydrocarbyloxy group, an amine group, a silyl group, or a monovalent organic group, each L is individually a neutral Lewis base, and n is a number from 0 through 3, or where Cp and Y are joined by a divalent group.

In one or more embodiments, where the two Cp groups of formula II are joined by a divalent group, the metallocene complex, which may be referred to as a bridged metallocene complex, may be defined by the formula III:

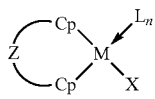

where M is a lanthanide-series element, scandium, or yttrium, each Cp is individually selected from a cyclopentadienyl group or a cyclopentadienyl derivative group, X is hydrogen atom, a halogen atom, an hydrocarbyloxy group, a thiohydrocarbyloxy group, an amine group, a silyl group, or a monovalent organic group, each L is individually a neutral Lewis base, and n is a number from 0 through 3, and Z divalent group.

In one or more embodiments, specific examples of metallocene complexes useful in the practice of this invention include, but are not limited to, bis(indenyl)gadolinium [N,N-bis(trimethylsilyl)amide], bis(2-methyl indenyl)gadolinium [N,N-bis(trimethylsilyl)amide], bis(2-phenyl indenyl)gadolinium [N,N-bis(trimethylsilyl)amide], bis(2-phenyl indenyl)gadolinium [N,N-bis(dimethylsilyl)amide], bis(1-methyl-2-phenyl indenyl)gadolinium [N,N-bis(dimethylsilyl)amide], bis(2-methyl indenyl)scandium[N,N-bis(trimethylsilyl)amide], and bis(indenyl)scandium [N,N-bis(trimethylsilyl)amide].

Alkylating Agent

As mentioned above, catalyst systems employed in the present invention include an alkylating agent. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolyl-isopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes, which can be represented by the general formula:

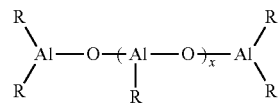

and oligomeric cyclic aluminoxanes, which can be represented by the general formula:

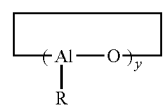

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with C2 to C12 hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

As mentioned above, alkylating agents useful in the present invention can comprise organomagnesium compounds. In one or more embodiments, organomagnesium compounds that can be utilized include those represented by the where each R independently can be a monovalent organic general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the include, but are not limited to, diethylmagnesium, di-n-general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

Non-Coordinating Anion

As mentioned above, the catalyst systems employed in the practice of this invention may include a non-coordinating anion. In one or more embodiments, a non-coordinating anion is a sterically bulky anion that does not form coordinate bonds with, for example, the active center of a catalyst system due to steric hindrance. In particular embodiments, non-coordinating anions include tetraarylborate anions such as fluorinated tetraarylborate anions. In one or more embodiments, non-coordinating anions include a counter cation such as a carbonium, an ammonium, or a phosphonium cation. For example, the counter cation may include a triarylcarbonium cation.

In one or more embodiments, the salt of a non-coordinating anion may be represented by the following formula:

where $[A]^+$ is a cation and $[B]^-$ is a non-coordinating anion.

Specific examples of non-coordinating anions include, but are not limited to, tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate.

Specific examples of salts of non-coordinating anions include, but are not limited to, N,N-dimethylanilinium tetrakis(pentafluorophenyl)borate and triphenylcarbonium tetrakis(pentafluorophenyl)borate.

Catalyst System Formation

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination of or reaction product of the metallocene complex, the alkylating agent, and the optional non-coordinating anion is conventionally referred to as a catalyst system or catalyst composition. The term catalyst composition or catalyst system may be employed to encompass a simple mixture of the ingredients, a complex of the various ingredients that is caused by physical or chemical forces of attraction, a chemical reaction product of the ingredients, or a combination of the foregoing.

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the metal of the metallocene complex (alkylating agent/M) can be varied from about 1:1 to about 100:1, in other embodiments from about 10:1 to about 60:1, and in other embodiments from about 20:1 to about 40:1.

In those embodiments where an aluminoxane is employed as the alkylating agent, the molar ratio of the aluminoxane to the metal of the metallocene complex (aluminoxane/M) can be varied from 1:1 to about 100:1, in other embodiments from about 10:1 to about 60:1, and in other embodiments from about 20:1 to about 40:1.

In those embodiments where the catalyst system employs a non-coordinating, the molar ratio of the non-coordinating anion to the metal of the metallocene complex (anion/M) can be varied from 0.5:1 to about 3:1, in other embodiments from about 0.7:1 to about 1.5:1, and in other embodiments from about 0.8:1 to about 1.2:1.

In one or more embodiments, the catalyst system can be formed by employing several techniques. In one or more embodiments, the catalyst may be formed by adding the catalyst components directly to the monomer to be polymerized. In this respect, the catalyst components may be added either in a stepwise or simultaneous manner. In one embodiment, when the catalyst ingredients are added in a stepwise manner, the metallocene complex can be added first, followed by the alkylating agent, and optionally followed by the non-coordinating anion. The addition of the catalyst components directly to the monomer to be polymerized may be referred to as an in situ formation of the catalyst system.

In other embodiments, the catalyst or a portion thereof may be preformed. That is, two or more of the catalyst ingredients may be introduced and pre-mixed outside of the monomer to be polymerized. For example, the metallocene complex and the alkylating agent may be combined within an appropriate solvent, optionally in the presence of a small amount of at least one conjugated diene monomer at an appropriate temperature, to form a blend. Then, the non-coordinating anion may be introduced to the blend of the metallocene complex and the alkylating agent to form the preformed catalyst (i.e. active catalyst). In other embodiments, the blend and the non-coordinating anion can be added separately and individually to the monomer to be polymerized.

In yet other embodiments, the catalyst is preformed by combining the metallocene complex with the counter anion to form a precursor complex. This precursor may be formed within an appropriate solvent optionally in the presence of a small amount of monomer. The alkylating agent can then be combined with the precursor to form the preformed catalyst. In other embodiments, the precursor complex and the alkylating agent can be added separately and individually to the monomer to be polymerized.

In particular embodiments, the preformation of the catalyst may occur either in the absence of any monomer or in the presence of a small amount of at least one conjugated diene monomer at an appropriate temperature, which is generally from about −20° C. to about 80° C. Mixtures of conjugated diene monomers may also be used. The amount of conjugated diene monomer that may be used for preforming the catalyst can range from about 1 to about 500 moles, in other embodiments from about 5 to about 250 moles, and in other embodiments from about 10 to about 100 moles per mole of the metallocene complex. The resulting preformed catalyst composition can be aged, if desired, prior to being added to the monomer that is to be polymerized.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic solvents are inert to the catalyst. In one or more embodiments, these organic solvent are liquid at ambient temperature and pressure. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

Polymerization System

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the metallocene complex used can be varied from about 0.0005 to about 0.01 mmol, in other embodiments from about 0.001 to about 0.009 mmol, and in other embodiments from about 0.003 to about 0.007 mmol, per 100 g of conjugated diene monomer.

In one or more embodiments, the polymerization system employed in the present invention may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The bulk polymerization may be conducted in conventional polymerization vessels known in the art. In one or more embodiments, the bulk polymerization can be conducted in a conventional stirred-tank reactor, especially if the monomer conversion is less than about 60%. In particular embodiments, the bulk polymerization is conducted within a first vessel to a monomer conversion of less than 20%, in other embodiments less than 15%, and in other embodiments less than 12%, and the polymer and unreacted monomer is removed from the first reactor and the polymerization is terminated. Examples of useful bulk polymerization processes employing low monomer conversion are disclosed in U.S. Pat. No. 7,351,776, which is incorporated herein by reference.

In other embodiments, especially where the monomer conversion is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The bulk polymerization can be carried out as a batch process, a continuous process, or a semi-continuous process. In the semi-continuous process, the monomer is intermittently charged as needed to replace that monomer already polymerized. The polymerization temperature may be varied. However, due to the limited solubility of cis-1,4-polybutadiene in 1,3-butadiene monomer at elevated temperatures, it is preferable to employ a relatively low polymerization temperature in order to maintain the polymerization mass in a single-phase homogeneous system, which allows the polymer molecular weight to be rigorously controlled and gives a uniform polymer product. In one or more embodiments, the conditions under which the polymerization proceeds may be controlled to maintain the temperature of the polymerization mixture within a range from about 0° C. to about 50° C., in other embodiments from about 5° C. to about 45° C., and in other embodiments from about 10° C. to about 40° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmospheres, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polymerization can be carried out to any desired conversions before the polymerization is terminated. In one or more embodiments, however, it may be desirable to avoid the high cement viscosity resulting from high conversions, as well as the possible separation of polymer as a solid phase from the monomer at high conversions due to the limited solubility of, for example, cis-1,4-polybutadiene, in monomer. Accordingly, in one embodiment, the conversion is in the range of from about 5% to about 60%. In another embodiment, the conversion is from about 10% to about 40%. In still another embodiment, the conversion is from about 15% to about 30%. The unreacted monomer can later be recycled back to the process.

Polymer Modification

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that provide a functional group at the end of a polymer chain without joining two or more polymer chains together, as well as compounds that couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent employed may be represented as a molar ratio of the functionality of the functionalizing agent to the metal of the metallocene complex (funct/M). In one or more embodiments, the molar ratio (funct/M) may be from about 0.5:1 to about 300:1, in other embodiments from about 1:1 to about 200:1, in other embodiments from about 10:1 to about 100:1, and in other embodiments from about 20:1 to about 50:1.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in co-pending U.S. Ser. No. 11/890,590, filed on Aug. 7, 2007, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Quenching and Additives

Once a functionalizing agent has been introduced to the polymerization mixture and a desired reaction time has been provided, a quenching agent may be optionally added to the polymerization mixture in order to deactivate any residual reactive polymer, catalyst, and/or catalyst components. In one or more embodiments, quenching agents include protic compounds, such as, but not limited to, alcohols, carboxylic acids, inorganic acids, or a mixture thereof. In particular embodiments, the quenching agent includes a polyhydroxy compound as disclosed in co-pending U.S. Ser. No. 11/890,591, filed on Aug. 7, 2007, which is incorporated herein by reference.

An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture.

Isolation

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Polymer Properties

Where cis-1,4-polydienes (e.g., cis-1,4-polybutadiene) are produced by one or more embodiments of the process of this invention, the cis-1,4-polydienes may advantageously have a cis-1,4 linkage content in excess of 96%, in other embodiments in excess of 97%, in other embodiments in excess of 98%, in other embodiments in excess of 98.5%, and in other embodiments in excess of 99%.

In one or more embodiments, the polydienes produced by the process of the present invention exhibit a molecular weight distribution ($M_w/M_n$) of less than about 2.7, in other embodiments less than about 2.5, in yet other embodiments less than about 2.2, and in still other embodiments less than about 2.0.

In particular embodiments, the cis-1,4-polydienes produced by the process of present invention have a cis-1,4-linkage content of greater than 98.4% and a molecular weight distribution of less than 2.0. This is advantageous because cis-1,4-polydienes having a narrower molecular weight distribution give lower hysteresis, whereas cis-1,4-polydienes having a higher cis-1,4-linkage content exhibit the increased ability to undergo strain-induced crystallization and thus give superior physical properties such as higher tensile strength and higher abrasion resistance.

In one or more embodiments, the polydienes produced by the process of the present invention exhibit a percent functionality, prior to quenching, of at least 35%, in other embodiments at least 40%, and in other embodiments at least 43%.

INDUSTRIAL APPLICATION

The cis-1,4-polydienes produced by the process of the present invention exhibit excellent viscoelastic properties and are particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4-linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

Synthesis of Bis(2-phenylindenyl)gadolinium [N,N-Bis(dimethylsilyl)amide] Complex To a Schlenk flask under an argon atmosphere was added 6.90 g (26.18 mmol) of gadolinium(III) chloride ($GdCl_3$) and 15.46 g (77.48 mmol) of potassium bis(trimethylsilyl)amide ($KN(SiMe_3)_2$). The solids were dissolved in 200 mL of THF and stirred under argon at room temperature overnight. After stirring overnight, all volatiles were removed in vacuo to afford a white solid. The resulting solid was redissolved in 200 mL of hexane and stirred for 1 hour at room temperature under argon. The solution was transferred via cannula and filtered through celite into a dry Schlenk flask and concentrated in vacuo to afford 11.68 g (69.9% yield) of tris(bis (trimethylsilyl)amido)gadolinium as a pale yellow solid.

To a Schlenk flask containing 11.68 g (18.30 mmol) of tris(bis(trimethylsilyl)amido)gadolinium was added 6.72 g (34.96 mmol) of 2-phenylindene. The solids were dissolved in 150 mL of hexanes and to this solution was added 12.98 mL (73.21 mmol) of 1,1,3,3-tetramethyldisilazane ($HN(SiHMe_2)_2$). The mixture was heated to 70° C. under argon overnight. After cooling to room temperature, the hexanes were removed via filtration. The resultant solid was redissolved in 100 mL of toluene and stirred under argon for 30 minutes at room temperature. The solution was then filtered and concentrated to afford 6.73 g (55% yield) of bis(2-phenylindenyl)gadolinium [N,N-bis(dimethylsilyl)amide] [(2-$PhC_9H_6)_2GdN(SiHMe_2)_2$] as a yellow solid.

Bulk Polymerization of Butadiene Using Gadolinium-Metallocene Catalyst

The polymerization reactor consisted of a one-gallon stainless cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket chilled by cold water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at 32° C., the polymerization was initiated by charging into the reactor a preformed catalyst that had been prepared by mixing in the following order 25 mL of toluene, 2.34 mL of 1.0 M diisobutylaluminum hydride (DIBAH) in toluene, 52.2 mg (0.078 mmol) of bis(indenyl)gadolinium [N,N-bis(dimethylsilyl)amide] complex, and 68.9 mg (0.086 mmol) of N,N-dimethylanilinium tetra(pentafluorophenyl)borate and allowing the mixture to age for 10 minutes. After 17.0 minutes from its commencement, the polymerization was functionalized by charging 10.0 mL of a 1.0 M 4,4'-bis(diethylamino)benzophenone (DEAB) solution in toluene and allowing the polymerization solution to stir for 5 minutes. The polymerization was terminated by diluting the polymerization mixture with 6.0 mL isopropanol dissolved in 1360 g of hexane and dropping the batch into 3 gallons of isopropanol containing 5 g of 2,6-di-tert-butyl-4-methylphenol. It was observed that the walls of the reactor and agitator shaft did not contain any gel after the bulk polymerization which was attributed to the minimum polymerization exotherm caused by the moderate polymerization rate (0.8% conversion per minute).

The coagulated polymer was drum-dried. The yield of the polymer was 172.2 g (13.2% conversion). The Mooney viscosity ($ML_{1+4}$) of the polymer was determined to be 25.9 at 100° C. by using a Monsanto Mooney viscometer with a large rotor, a one-minute warm-up time, and a four minute running time. As determined by gel permeation chromatography (GPC), the polymer had a number average molecular weight ($M_n$) of 124,000 g/mol, a weight average molecular weight ($M_w$) of 211,000 g/mol, and a molecular weight distribution ($M_w/M_n$) of 1.7. The microstructure was measured and showed a cis-1,2 content of 98.5, trans-1,4 content of 0.9%, and a vinyl content of 0.6. To determine percent functionality, the GPC instrument was equipped with a differential refractive index (RI) detector and an ultraviolet (UV) absorption detector. The GPC UV/RI ratio, which is the ratio of the UV detector signal to the RI detector signal, was used to calculate the percent functionality of the polymer sample by referencing the GPC UV/RI ratio of the functionalized cis-1,4-polybutadiene to the UV/RI ratio of a functionalized polybutadiene sample that is produced by using anionic polymerization and has the same $M_n$. Using the above method, the percent functionality was determined to be 44%.

What is claimed is:

1. A process for preparing a polydiene, the process comprising the steps of: polymerizing conjugated diene monomer with a metallocene complex catalyst system within a polymerization mixture that includes less than 20% by weight of solvent based on the total weight of the polymerization mixture, to produce a polymer chain with a reactive chain end, and introducing a functionalizing agent into the polymerization mixture to react with the reactive polymer chain end to produce a functionalized polymer, where the metallocene complex catalyst system includes the combination or reaction product of: (a) metallocene complex, (b) an alkylating agent, and optionally (c) a non-coordinating anion, and where the metallocene complex is defined by the formula I

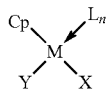

where M is a lanthanide-series element, scandium, or yttrium, Cp is a cyclopentadienyl group or a cyclopentadienyl derivative group, Y is a hydrocarbyloxy group, a thiohydrocarbyloxy group, an amine group, a silyl group, cyclopentadienyl group, or a cyclopentadienyl derivative group, X is hydrogen atom, a halogen atom, a hydrocarbyloxy group, a thiohydrocarbyloxy group, an amine group, a silyl group, or a monovalent organic group, each L is individually a neutral Lewis base, and n is a number from 0 through 3, or where Cp and Y are joined by a divalent group.

2. The process of claim 1, where the polymerization mixture includes less than 5% by weight of solvent based on the total weight of the polymerization mixture.

3. The process of claim 1, where said step of polymerizing takes place within a polymerization mixture that is substantially devoid of solvent.

4. The process of claim 1, where Y is a cyclopentadienyl group or a cyclopentadienyl derivative group.

5. The process of claim 1, where Y is a hydrocarbyloxy group, a thiohydrocarbyloxy group, an amine group, or a silyl group.

6. The process of claim 5, where Y is a hydrocarbyloxy group.

7. The process of claim 5, where Y is a thiohydrocarbyloxy group.

8. The process of claim 5, where Y is an amine group.

9. The process of claim 5, where Y is a silyl group.

10. The process of claim 1, where Cp and Y are joined by a divalent group.

11. The process of claim 1, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

12. The process of claim 1, where the alkylating agent is an organoaluminum compound.

13. The process of claim 1, where the alkylating agent is an organomagnesium compound.

14. The process of claim 1, where said process employs a non-coordinating anion.

15. The process of claim 1, where the molar ratio of the alkylating agent to the metal of the metallocene complex is from about 1:1 to about 1:100.

16. The process of claim 1, where the alkylating agent is an aluminoxane, and where the molar ratio of the aluminoxane to the metal of the metallocene complex is from about 1:1 to about 1:100.

17. The process of claim 1, where from about 0.0005 to about 0.01 mmol of the metallocene complex is used per 100 g of the conjugated diene monomer.

18. The process of claim 1, where said step of polymerizing achieves a monomer conversion of from about 5% to about 60%.

* * * * *